US012756194B2

(12) United States Patent
Namba et al.

(10) Patent No.: US 12,756,194 B2
(45) Date of Patent: Oct. 6, 2026

(54) DATA ANALYSIS SYSTEM AND METHOD

(71) Applicant: HITACHI, LTD., Tokyo (JP)

(72) Inventors: Kazuki Namba, Tokyo (JP); Masato Utsumi, Tokyo (JP); Tohru Watanabe, Tokyo (JP); Ikuo Shigemori, Tokyo (JP); Hiroshi Iimura, Tokyo (JP); Daisuke Hamaba, Tokyo (JP); Dan Zhao, Tokyo (JP); Hiroaki Ogawa, Tokyo (JP); Jun Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 887 days.

(21) Appl. No.: 18/024,543

(22) PCT Filed: Sep. 8, 2021

(86) PCT No.: PCT/JP2021/033064
§ 371 (c)(1),
(2) Date: Mar. 3, 2023

(87) PCT Pub. No.: WO2022/137664
PCT Pub. Date: Jun. 30, 2022

(65) Prior Publication Data

US 2023/0402846 A1 Dec. 14, 2023

(30) Foreign Application Priority Data

Dec. 21, 2020 (JP) ................................ 2020-211475

(51) Int. Cl.
*H02J 3/17* (2026.01)
*H02J 3/00* (2006.01)

(52) U.S. Cl.
CPC ................ *H02J 3/17* (2026.01); *H02J 3/003* (2020.01)

(58) Field of Classification Search
CPC ......... H02J 3/144; H02J 3/003; G06F 16/903; G06Q 10/04
See application file for complete search history.

(56) References Cited

U.S. PATENT DOCUMENTS

| | | | | |
|---|---|---|---|---|
| 12,061,960 | B2 * | 8/2024 | Tanaka | G06N 20/20 |
| 2006/0259744 | A1 * | 11/2006 | Matthes | G06F 15/7867 712/220 |

(Continued)

FOREIGN PATENT DOCUMENTS

| | | | |
|---|---|---|---|
| JP | 2006011715 A | | 1/2006 |
| JP | 2020035413 A | * | 3/2020 |

OTHER PUBLICATIONS

International Search Report of PCT/JP2021/033064 dated Dec. 7, 2021.

*Primary Examiner* — Santosh R Poudel
(74) *Attorney, Agent, or Firm* — MATTINGLY & MALUR, PC

(57) ABSTRACT

A system generates a first tree structure representing a relation of a plurality of measurement data sets, and generates goodness-of-fit data based on at least a part of attribute data regarding one or more branch portions included in the first tree structure. The attribute data includes one or more attribute values at one or more points in time regarding each of one or more attribute items. The goodness-of-fit data includes goodness-of-fit for each attribute item regarding each branch portion. With regard to each attribute item for each branch portion, goodness-of-fit is a value calculated based on a parent node and two or more child nodes belonging to the relevant branch portion, and one or more attribute values corresponding to the relevant attribute item, and represents a degree that the relevant attribute item will fit as a base of a branch condition. The system generates a second tree structure in which a branch condition decided (Continued)

based on the goodness-of-fit data is associated with a branch portion included in the first tree structure, and performs data estimation using the second tree structure.

14 Claims, 14 Drawing Sheets

(56) References Cited

U.S. PATENT DOCUMENTS

| | | | | |
|---|---|---|---|---|
| 2008/0235192 | A1* | 9/2008 | Kanaya | G06F 16/9027 |
| 2015/0112616 | A1* | 4/2015 | Teranishi | G01R 21/133 702/60 |
| 2015/0339572 | A1* | 11/2015 | Achin | G06N 5/04 706/46 |
| 2021/0004698 | A1* | 1/2021 | Takagi | G06N 5/045 |
| 2021/0224247 | A1* | 7/2021 | Carvalho | G06F 16/2365 |
| 2022/0188648 | A1* | 6/2022 | Shi | G06N 5/01 |

* cited by examiner

FIG. 9

900

| | Branch Portion 1 | Branch Portion 2 | Branch Portion 3 | ... | Branch Portion M |
|---|---|---|---|---|---|
| Temperature | 0.47 | 0.68 | 0.04 | ... | AA |
| Day Type | 0.07 | 0.79 | 0.28 | ... | BB |
| Solar Radiation Amount | 0.76 | 0.88 | 0.54 | ... | CC |
| ⋮ | ⋮ | ⋮ | ⋮ | | ⋮ |
| Attribute N | WW | XX | YY | ... | ZZ |

DATA ANALYSIS SYSTEM AND METHOD

TECHNICAL FIELD

The present invention generally relates to the generation of a tree structure for use in estimation in data analysis and to the performance of data analysis using the generated tree structure and, for example, relates to technology for predicting a future power demand or supporting such prediction.

BACKGROUND ART

In energy business areas such as power business and gas business, communication business areas, and transportation business areas such as taxi business and delivery business, a prediction system predicts a value of a future demand in order to perform equipment operation or resource allocation that coincides with the demand of consumers.

For example, in the field of power business, there is a physical restriction where the power generation amount and the demand of electricity must coincide at all times. Since it is necessary to cause a necessary and sufficient number of generators to stand by, it is necessary to accurately predict the demand of power.

Moreover, in order to accurately predict the demand of power, it is necessary to clearly extract the main factors that cause changes in demands such as demand characteristics and regional characteristics.

PTL 1 discloses a method of classifying a plurality of consumers into groups in which the pattern of consumption of electric energy is similar, identifying the group to which the consumers subject to estimation belongs, and estimating the resource consumption per unit time.

CITATION LIST

Patent Literature

[PTL 1] Japanese Unexamined Patent Application Publication No. 2006-11715

SUMMARY OF THE INVENTION

Problems to be Solved by the Invention

Meanwhile, a tree structure is used in estimation such as the prediction of an observational data set (data set including values observed in each of one or more points in time) of the demand of power or the like. Estimation using a tree structure can also be applied to the estimation disclosed in PTL 1.

As general methods of generating a tree structure, there are, for example, a CART (Classification and Regression Tree) method and a CHAID (CHi-square Automatic Interaction Detection) method. In other words, according to the general tree structure generation methods, a root node is decided based on a plurality of observational data sets that was provided, and lower nodes and a branch condition to the lower nodes are decided sequentially downward from the root node.

Nevertheless, according to this kind of general tree structure generation method, if a branch condition regarding a certain branch portion is not found, a node that is lower than that branch portion cannot be decided. In other words, the tree structure cannot go deeper to a lower node from a certain branch portion. Thus, even when this tree structure is used, it becomes difficult to accurately estimate the target of estimation such as the expected value and deviation range of the prediction of an observational data set of a demand or the like.

The foregoing problems may also arise in the generation of a tree structure based on a measurement data set other than an observational data set of a power demand or the like.

Means to Solve the Problems

A system generates a first tree structure representing a relation of a plurality of measurement data sets, and generates goodness-of-fit data based on at least a part of attribute data regarding one or more branch portions included in the first tree structure. The attribute data includes one or more attribute values at one or more points in time regarding each of one or more attribute items. The goodness-of-fit data includes goodness-of-fit regarding each of one or more attribute items regarding each of the one or more branch portions. With regard to each of the one or more attribute items for each branch portion, goodness-of-fit is a value calculated based on a parent node and two or more child nodes belonging to the relevant branch portion, and one or more attribute values corresponding to the relevant attribute item, and represents a degree that the relevant attribute item will fit as a base of a branch condition. The system generates a second tree structure in which a branch condition decided based on the goodness-of-fit data is associated with a branch portion included in the first tree structure, and performs data estimation using the second tree structure.

Advantageous Effects of the Invention

According to the present invention, it is expected that accurate estimation of the target of estimation can be performed.

BRIEF DESCRIPTION OF DRAWINGS

FIG. 9 is a diagram showing an overview of the goodness-of-fit data.

DESCRIPTION OF EMBODIMENTS

Figure 1:
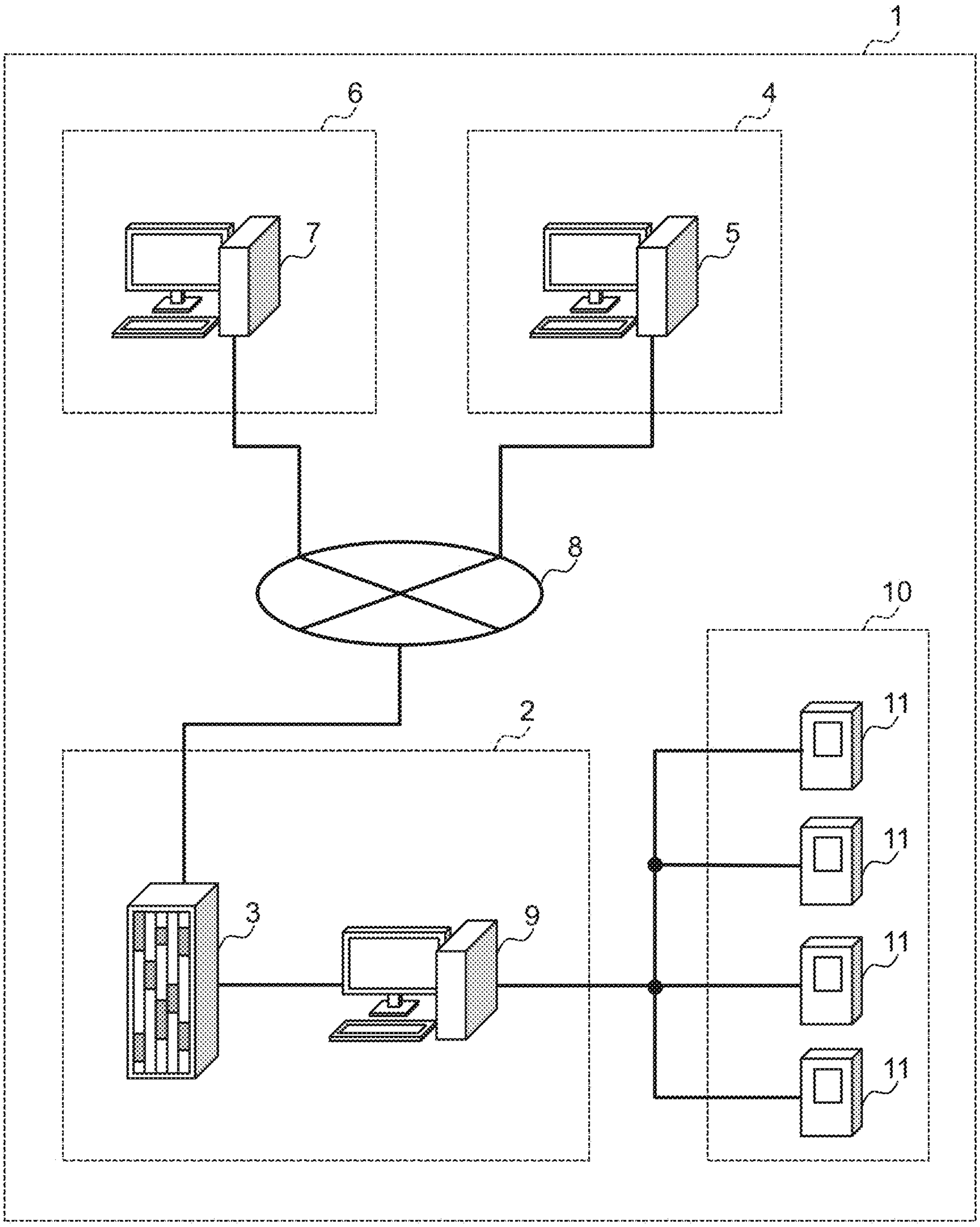
FIG. 1 is a diagram showing the device configuration of the data processing system according to the first embodiment.

In the following explanation, "interface apparatus" may be one or more interface devices. The one or more interface devices may be at least one of the following.

- One or more I/O (input/Output) interface devices. An I/O (input/Output) interface device is an interface device to at least one of either an I/O device or a remote display computer. An I/O interface device to a display computer may be a communication interface device. At least one I/O device may be a user interface device, for example, one of either an input device such as a keyboard or a pointing device, or an output device such as a display device.
- One or more communication interface devices. One or more communication interface devices may be one or more same type of communication interface devices (for example, one or more NICs (Network Interface Cards)) or two or more different types of communication interface devices (for example, an NIC and an HBA (Host Bus Adapter)).

Moreover, in the following explanation, "memory" is one or more memory devices, and is typically a primary storage device. At least one memory device in a memory may be a volatile memory device or a nonvolatile memory device.

Moreover, in the following explanation, "persistent storage apparatus" is one or more persistent storage devices. A persistent storage device is typically a non-volatile storage device (for example, auxiliary storage device), and is specifically, for example, an HDD (Hard Disk Drive) or an SSD (Solid State Drive).

Moreover, in the following explanation, "storage apparatus" may be at least a memory or a memory of a persistent storage apparatus.

Moreover, in the following explanation, "processor" is one or more processor devices. While at least one processor device is typically a microprocessor device such as a CPU (Central Processing Unit), it may also be another type of processor device such as a GPU (Graphics Processing Unit). At least one processor device may be a single-core processor device or a multi-core processor device. At least one processor device may be a processor core. At least one processor device may be a processor device in a broad sense such as a hardware circuit (for example, FPGA (Field-Programmable Gate Array), or ASIC (Application Specific Integrated Circuit)) which performs a part or all of the processing.

Moreover, in the following explanation, while a function may be explained using an expression such as "yyy unit", the function may be realized by one or more computer programs being executed with a processor, or realized by one or more hardware circuits (for example, FPGA or ASIC), or realized based on a combination thereof.

When a function is realized by a program being executed with a processor, since predetermined processing will be performed using a storage apparatus and/or an interface device as appropriate, the function may also be at least a part of the processor. Processing explained with a function as the subject may be processing performed by a processor or a device including such processor. A program may be installed from a program source. A program source may be, for example, a recording medium (for example, non-temporary recording medium) readable with a program distribution computer or a computer. The explanation of each function is an example, and a plurality of functions may be consolidated into one function, or one function may be divided into a plurality of functions.

Moreover, in the following explanation, the single word of "data set" may be one logical data set (for example, aggregate of one or more values) viewed from a program such as an application program.

Moreover, in the following explanation, when providing an explanation without differentiating the same elements, a common symbol among the reference symbols will be used, and when providing an explanation by differentiating the same elements, the corresponding reference symbol will be used.

Several embodiments of the present invention are now explained in detail with reference to the appended drawings.

(1) First Embodiment

(1-1) Configuration of the Data Processing System Including the Observational Data Analysis System According to this Embodiment FIG. 1 shows the device configuration of the data processing system according to this embodiment.

The data processing system 1, when applied to the power industry sector for instance, analyzes the actual amount of the past power demand, and estimates the power demand or the estimated value of the transaction price of a prescribed period in the future, present or past. The data processing system 1 enables the supply and demand management of power such as the formulation and execution of an operation plan of generators and the formulation and execution of a procurement transaction plan of power from other electricity providers based on the estimated values.

The data processing system 1 is configured from an observational data analysis system 3 (example of a data analysis system) and an operation device 9 to be used by an analysis user 2, an attribute data storage system 7 to be used by an attribute provider 6, an observational data storage system 5 to be used by an observation provider 4, and supply and demand management equipment 10 including one or more control devices 11. The systems 3, 5 and 7 are coupled to a communication path 8. The communication path 8 is a network such as a LAN (Local Area Network) or a WAN (Wide Area Network), and mutually and communicably connects the respective devices configuring the data processing system 1 and the terminals. The operation device 9 uses the results analyzed by the observational data analysis system 3 and performs the operation and control of equipment such as generators and communication stations, and the creation and execution of plans related to market trading and the like.

The analysis user 2 is a user of the observational data analysis system 3. The attribute provider 6 is a provider of attribute data. The observation provider 4 is a provider of observational data.

The data processing system 1 as a specific example is, for example, as follows.

The analysis user 2 corresponds to an operator of the supply and demand management equipment 10, the observation provider 4 and the observational data storage system 5 respectively correspond to a consumer and a power measurement device, and the attribute provider 6 and the attribute data storage system 7 respectively correspond to a public data provider and a public data storage system. Moreover, the supply and demand management equipment 10 may also include a generator, power storage equipment, a switch and the like, and the control device 11 may be, for example, a market transaction management device, a generator control device, a power storage equipment control device and a switch control device. Note that "public data" may be an example of attribute data (details of "attribute data" will be described later).

The observational data storage system 5 stores observational data for generating a first tree structure. The observational data is an example of measurement data, and may include one or more observational data sets. "Observational data" is an example of a measurement data set including measured values at each of one or more points in time, and, for example, may be a data set representing the energy consumption of power, gas, water or the like, a data set representing the production volume of energy such as solar power generation or wind power generation, and a data set representing a transaction price of energy traded in a wholesale energy market. Moreover, outside the power industry sector, these observational data sets may be a data set representing a communication value measured in a communication base station or the like, or a data set representing a history of location information of a mobile object such as an automobile. Moreover, these observational data sets may be a data set of measuring equipment units, or a data set as a total of a plurality of measuring equipment. An observational data set may exist, for example, for each period or for each region. An observational data set may be, for example, a time series of observation values at one or more points in time. An "observation value" may be the value itself that was actually measured, or a value that was decided based on a plurality of values that were actually observed. The observational data storage system 5 searches and/or sends observational data according to a data acquisition request from another device.

The attribute data storage system 7 stores attribute data as a candidate of a branch condition to be assigned to the first tree structure. "Attribute data" may include one or more attribute data sets. An "attribute data set" may include attribute values at each of one or more points in time and may be, for example, a data set related to weather such as temperature, humidity, solar radiation amount, wind speed, and atmospheric pressure, a calendar day data set such as a flag value indicating a type among date, weekday, and arbitrarily set day, a data set indicating the occurrence/non-occurrence of an incident such as a typhoon or event, a data set of industry dynamics such as the number of energy consumers, corresponding industries, and production quantity and sales volume for each industry or for each company, a data set indicating the characteristics of the geography or weather of each region, and a data set of the number of communication terminals coupled to the communication base station. Moreover, an attribute data set may include the observational data set itself that was previously estimated or actually observed. An attribute data set may be, for example, a time series of attribute values at one or more points in time. An "attribute value" may be the actual value itself or a value decided based on a plurality of actual values. The attribute data storage system 7 searches and/or sends attribute data according to a data acquisition request from another device.

The observational data analysis system 3 performs analysis using the observational data acquired from the observational data storage system 5, and the attribute data acquired from the attribute data storage system 7.

The observational data analysis system 3 comprises a first tree structure generation unit which generates a first tree structure indicating a similarity relation between observational data sets by grouping observational data sets in which the mode of time course is similar in order from the closest distance, a goodness-of-fit data generation unit which generates, based on attribute data, goodness-of-fit data representing the goodness-of-fit for each attribute item regarding each branch portion of the first tree structure, a second tree structure generation unit which generates a second tree structure in which a branch condition is associated with a branch portion included in the first tree structure based on the goodness-of-fit data, and an estimation unit which performs estimation of the transition of values of observational data in the future or present or past, or the fluctuation range thereof, using the second tree structure. The "goodness-of-fit" for each attribute item regarding each branch portion represents the appropriateness of using the relevant attribute item as the base of the branch condition regarding the relevant branch portion and may be, for example, an impurity represented by entropy, gini impurity, or classification error after branching or an information gain before and after branching which follows the threshold (boundary of attribute values) decided based on the two or more child nodes belonging to the relevant branch portion and one or more attribute values of the relevant attribute item.

(1-2) Internal Configuration

Figure 2:
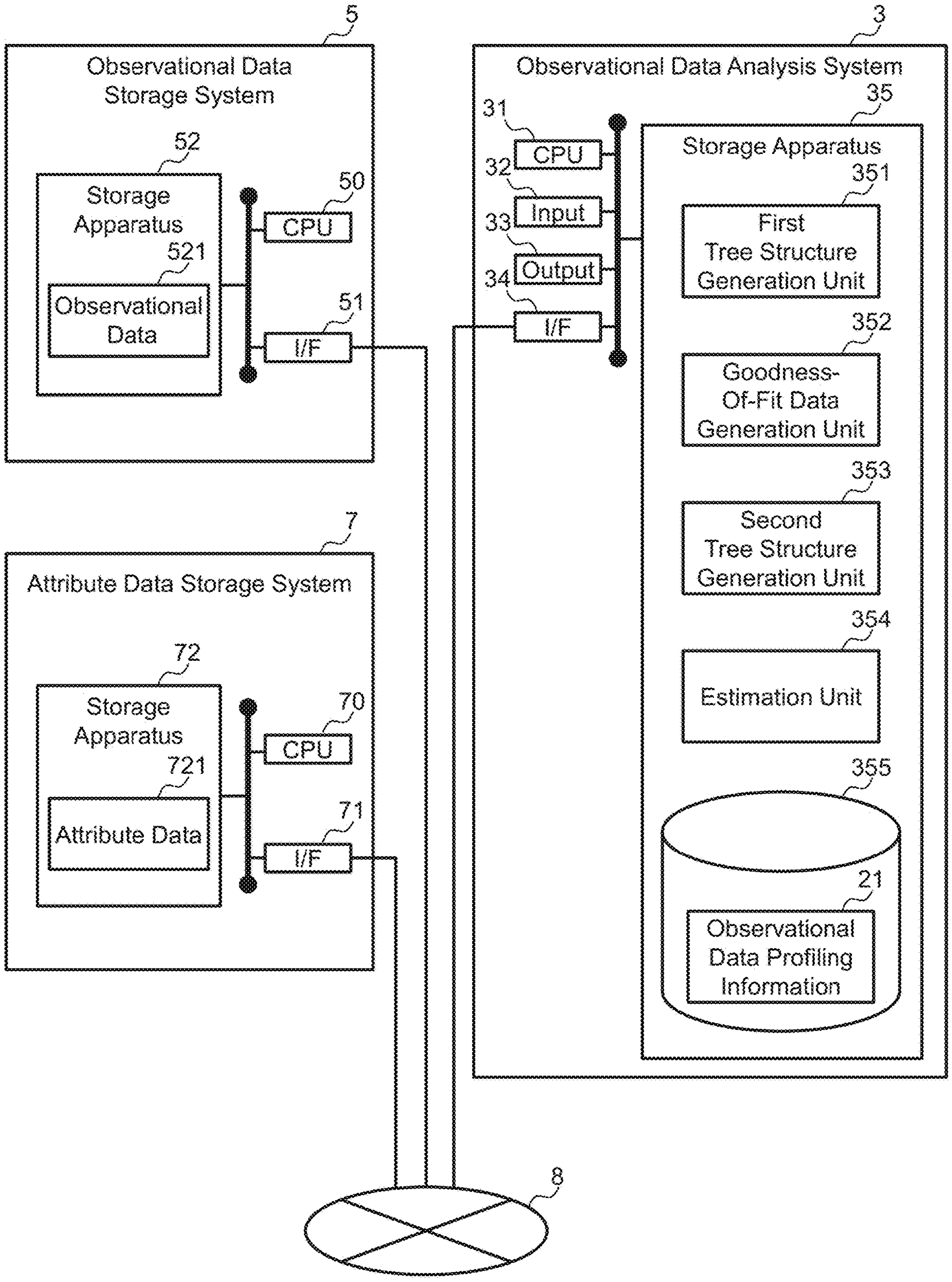
FIG. 2 is a diagram showing the internal configuration of the observational data analysis system, the observational data storage system and the attribute data storage system according to the first embodiment.

FIG. 2 shows the internal configuration of the observational data analysis system 3, the observational data storage system 5, and the attribute data storage system 7 included in the data processing system 1.

The observational data analysis system 3 is configured from an input device 32, an output device 33, an VF apparatus 34 (interface apparatus), a storage apparatus 35 and a CPU 31 (example of a processor) coupled to the foregoing devices. The observational data analysis system 3 may be, for example, an information processing system such as a personal computer, a server computer or a hand-held computer.

The input device 32 may be configured from a keyboard or a mouse. The output device 33 may be configured from a display or a printer. The I/F apparatus 34 may be an NIC (Network Interface Card) for connection to a wireless LAN or a cable LAN. Moreover, the storage apparatus 35 may include a storage medium such as a RAM (Random Access Memory) or a ROM (Read Only Memory). The output result or the interim result of the respective processing units 351 to 354 may be output as needed via the output device 33.

The storage apparatus 35 stores one or more computer programs for realizing processing units (functions) such as a first tree structure generation unit 351, a goodness-of-fit data generation unit 352, a second tree structure generation unit 353 and an estimation unit 354 based on the CPU 31. As a result of the one or more computer programs being executed by the CPU 31, the processing units 351 to 354 are realized. Moreover, the storage apparatus 35 includes a storage area 355 for storing data such as observational data profiling information 21. The observational data profiling information 21 may be information including information of at least a part among database information, text information and image information representing the generation result of a second tree structure.

The observational data storage system 5 is configured from an I/F apparatus 51, a storage apparatus 52 and a CPU 50 coupled to the foregoing devices. The storage apparatus 52 stores data such as observational data 521. The CPU 50 performs the input/output of the observational data 521.

The attribute data storage system 7 is configured from an I/F apparatus 71, a storage apparatus 72 and a CPU 70 coupled to the foregoing devices. The storage apparatus 72 stores data such as attribute data 721. The CPU 70 performs the input/output of the attribute data 721.

(1-3) Processing and Data Flow of the Observational Data Analysis System 3

The data flow and the processing flow of the observational data analysis system 3 according to this embodiment are now explained with reference to FIG. 3 and FIG. 4.

Figure 3:
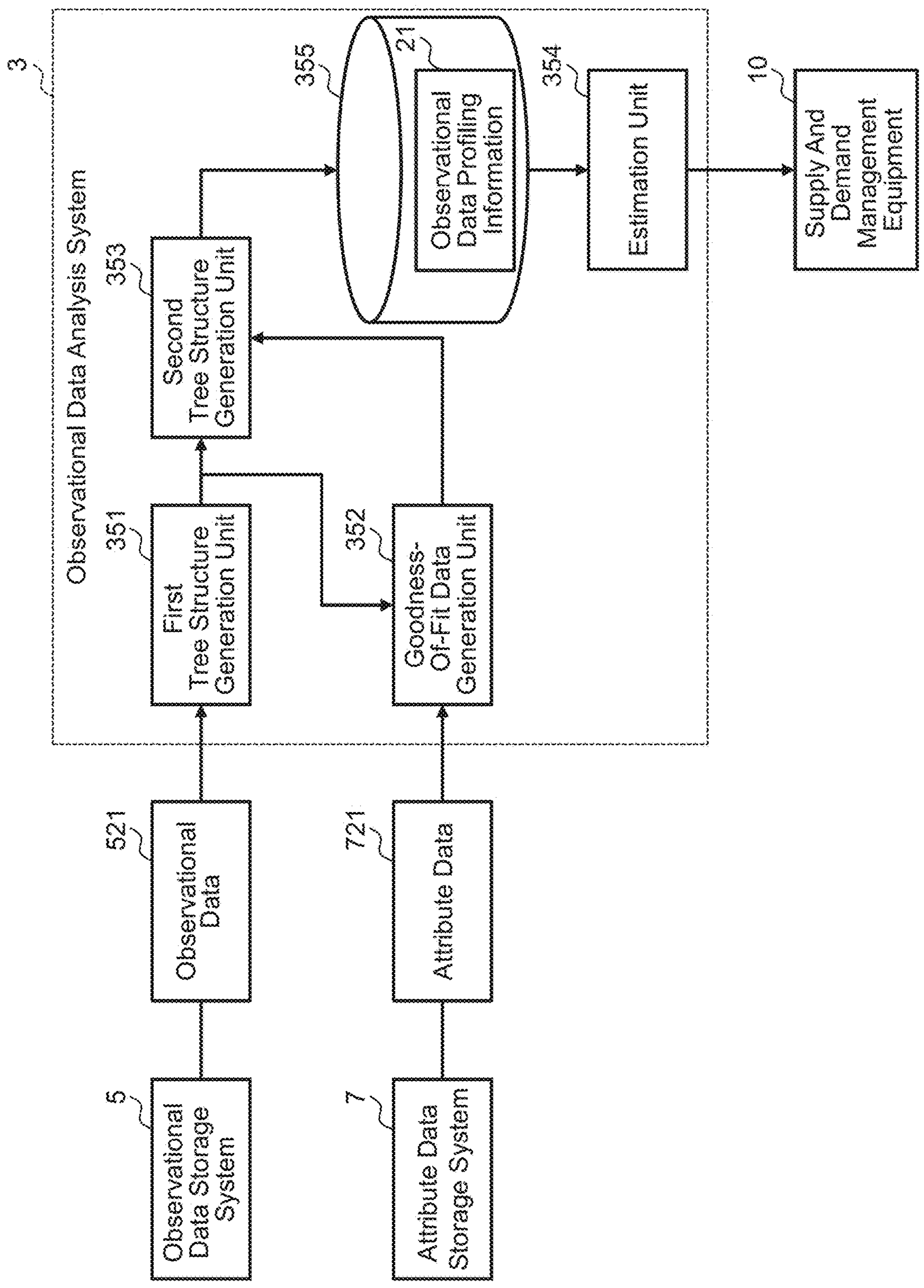
FIG. 3 is a diagram showing the data flow of the observational data analysis system.
Figure 4:
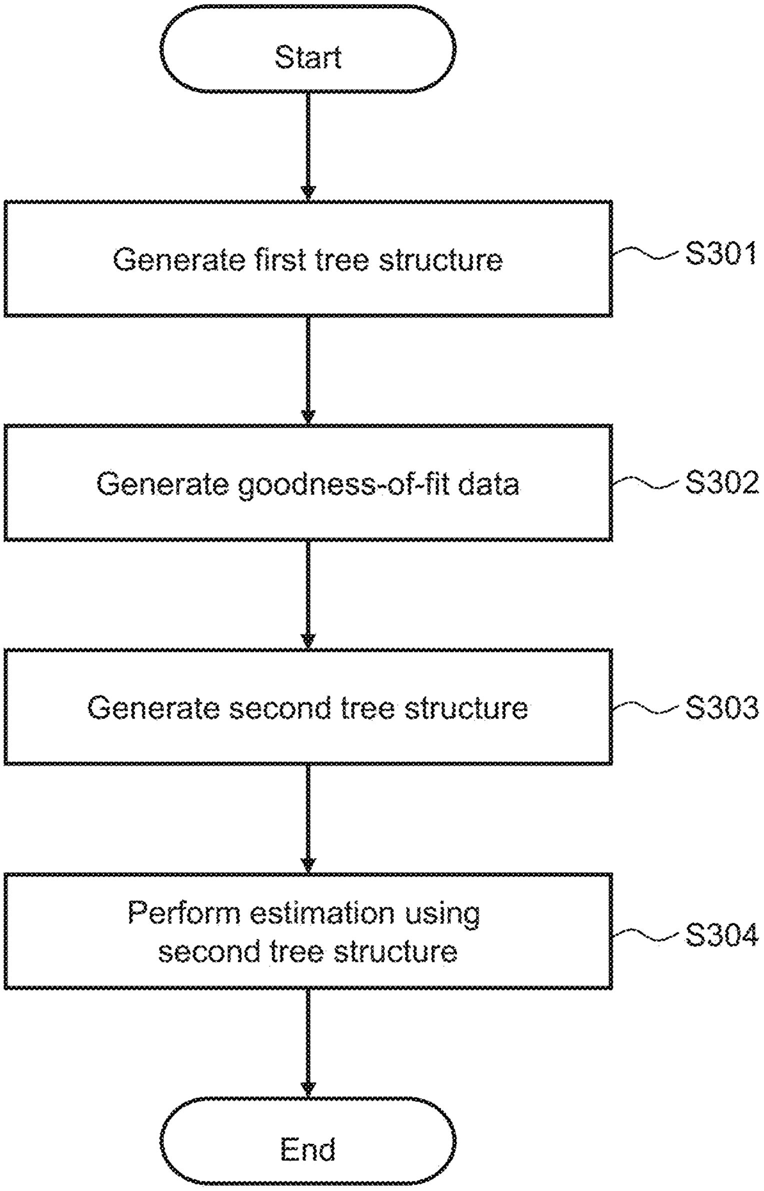
FIG. 4 is a diagram showing the processing flow of the observational data analysis system.

FIG. 3 shows the data flow of the observational data analysis system 3. FIG. 4 shows the processing flow of the observational data analysis system 3. The observational data analysis processing may be, for example, processing that is started upon accepting an input operation from the analysis user 2 using the system through the input device 32 equipped in the observational data analysis system 3, or upon reaching the execution timing separately set in the storage apparatus 35.

The observational data analysis system 3 according to this embodiment receives the observational data 521 and the attribute data 721 from the observational data storage system 5 and the attribute data storage system 7, respectively.

The observational data 521 is input to the first tree structure generation unit 351. The first tree structure generation unit 351 groups the first tree structure indicating the similarity relation between observational data sets in the input observational data 521 in which the mode of time course is similar in order from the closest distance, and outputs the grouped first tree structure (S301). "Distance" may be a distance that is generally used such as the Euclidean distance, Mahalanobis' generalized distance, Manhattan distance, Chebyshev distance, Minkowski distance, or cosine distance. Moreover, the processing of grouping may be, for example, hierarchical clustering as represented by the Ward method, single linkage method, complete linkage method, or centroid method.

The attribute data 721 is input to the goodness-of-fit data generation unit 352 together with the first tree structure output from the first tree structure generation unit 351. The goodness-of-fit data generation unit 352 calculates the goodness-of-fit for each attribute item based on at least a part of the attribute data 721 regarding each branch portion of the first tree structure, generates the goodness-of-fit data representing the calculation result, and outputs the generated goodness-of-fit data (S302). The goodness-of-fit is calculated, for example, by searching for a value in which an index that is generally used for generating a tree structure, such as an impurity represented by entropy, gini impurity, or classification error, or information gain, as described above, becomes optimal.

The first tree structure output from the first tree structure generation unit 351 and the goodness-of-fit data output from the goodness-of-fit data generation unit 352 are input to the second tree structure generation unit 353. The second tree structure generation unit 353 generates a second tree structure by assigning, to a branch portion included in the first tree structure, a branch condition decided based on the goodness-of-fit represented by the goodness-of-fit data, and outputs the generated second tree structure (S303).

Information related to the second tree structure output from the second tree structure generation unit 353 is included in the observational data profiling information 21.

The observational data profiling information 21 is input to the estimation unit 354. The estimation unit 354 uses the second tree structure in the observational data profiling information 21 and performs estimation of the transition of values of observational data in the future or present or past, or the fluctuation range thereof (S304).

The observational data analysis processing according to this embodiment is thereby completed.

The detailed embodiment of each unit is now explained.

(1-4) Details of Each Constituent Element (1-4-1) First Tree Structure Generation Unit An embodiment of the first tree structure generation unit 351 is now explained with reference to FIG. 5 to FIG. 7.

Figure 5:
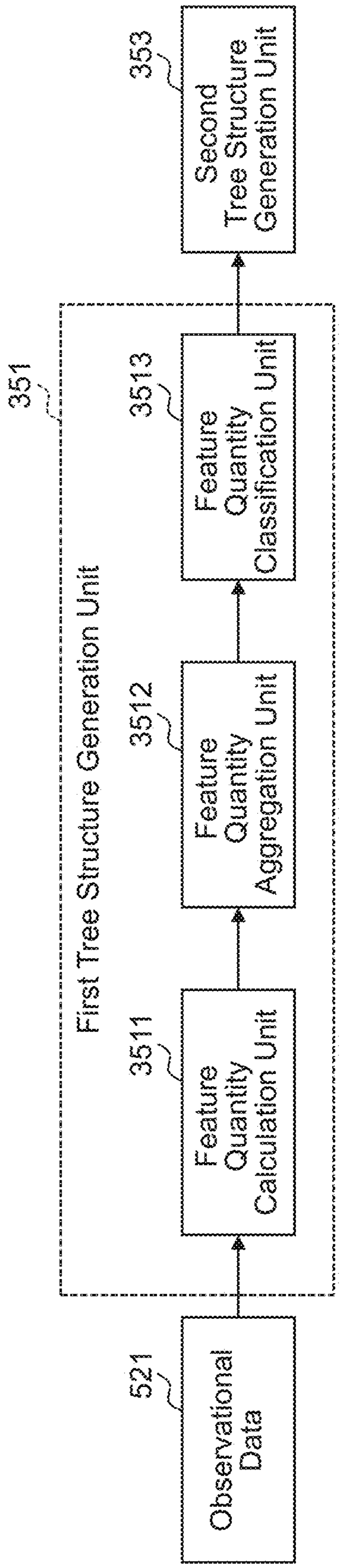
FIG. 5 is a diagram showing the data flow of the first tree structure generation unit.

FIG. 5 shows the internal data flow of the first tree structure generation unit 351.

The first tree structure generation unit 351 is configured from a feature quantity calculation unit 3511, a feature quantity aggregation unit 3512, and a feature quantity classification unit 3513.

The feature quantity calculation unit 3511, with each observational data set in the observational data 521 as the input, calculates the feature quantity of the relevant observational data set regarding each of the observational data sets, and outputs the calculated feature quantity. The calculation of the feature quantity of an observational data set may be, for example, processing of normalizing the values representing the mode of transition of the observation values in the observational data set and/or processing of performing Fourier transformation or wavelet transformation for extracting the frequency characteristics from the observational data set.

The feature quantity aggregation unit 3512, with each feature quantity (feature quantity of each observational data set) output from the feature quantity calculation unit 3511 as the input, aggregates the feature quantities in which the distance is within a certain range by using the distance information of the feature quantity, calculates one representative feature quantity at a time from the feature quantities included in the relevant aggregation unit for each aggregation unit (cluster), and outputs the calculated representative feature quantity. As the processing of performing aggregation by using the distance information of the feature quantity, a publicly known aggregation method may be used. As the publicly known aggregation method, used may be a clustering method as the proximity optimization method such as k-means, EM algorithm or spectral clustering, or a clustering method as the classification boundary optimization method such as unsupervised SVM (Support Vector Machine), VQ algorithm, or SOM (Self-Organizing Maps). Moreover, a representative feature quantity refers to the cluster barycenter of each cluster generated based on a non-hierarchical clustering method.

The feature quantity classification unit 3513, with the representative feature quantity output from the feature quantity aggregation unit 3512 as the input, generates a first tree structure by grouping the feature quantities in order from the closest distance. The processing of performing grouping may be, for example, processing of performing hierarchical clustering represented by the Ward method, single linkage method, complete linkage method, or centroid method. Otherwise, a simpler grouping method based only on the distance information of the representative feature quantity calculated from the sequentially grouped feature quantities may also be used. The feature quantity classification unit 3513 outputs the first tree structure generated based on the foregoing processing as database information or text information.

The processing contents of the first tree structure generation unit 351 are now specifically explained with reference to FIG. 6 and FIG. 7. As an example, let it be assumed that the input observational data sets are power demand data sets 17A1 to 17A4 representing the transition of the power demand (electric energy demand).

Foremost, the feature quantity calculation unit 3511 normalizes each of the power demand data sets 17A1 to 17A4 so that the sequence of values of each of the power demand data sets 17A1 to 17A4 becomes average value 0 and variance 1. In addition, the feature quantity calculation unit 3511 performs Fourier series expansion to each of the normalized power demand data sets 17A1 to 17A4, and compiles each of the obtained factors as vector quantities. The feature quantity calculation unit 3511 outputs each of the vector quantities as the feature quantities 14A1 to 14A4.

Next, the feature quantity aggregation unit 3512 performs generation processing of the first tree structure to the feature quantities 14A1 to 14A4. Specifically, the feature quantity aggregation 3512 forms a group configured from two feature quantities among the feature quantities 14A1 to 14A4 (for example, aggregate of two feature quantities in which the distribution of data will be minimal), and calculates the representative feature quantity as the feature quantity related to that group. The feature quantity classification 3513 performs the generation processing of the first tree structure when there are two or more feature quantities (may also include the representative feature quantity) that have not been grouped. The foregoing operation is repeated until all feature quantities are ultimately compiled into a single group.

Figure 6:
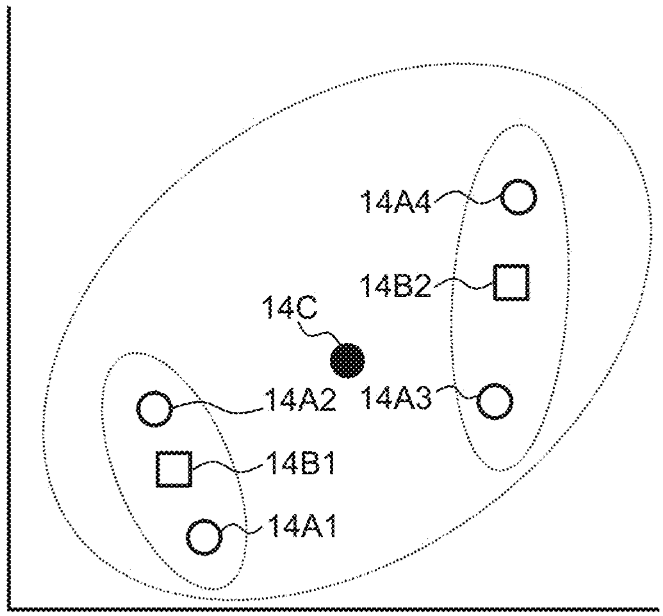
FIG. 6 is a diagram showing an overview of the processing of the first tree structure generation unit.

In the example of FIG. 6, foremost, the feature quantities 14A1 and 14A2 are grouped, and the representative feature quantity 14B1 of that group is calculated as a new feature quantity. Next, the feature quantities 14A3 and 14A4 are grouped, and the representative feature quantity 14B2 of that group is calculated as a new feature quantity. Finally, the feature quantities (representative feature quantities) 14B1 and 14B2 are grouped, and a single group having the representative feature quantity 14C of that group is formed. FIG. 7 shows a first tree structure according to the results of the grouping described in the foregoing example. A vertical height 1712 of the branch portions in the illustrated first tree structure represents the distance of the feature quantities, and represents that the position of the branch portion is higher as the distance is farther. Note that, in this specification, while terms such as "group" and "cluster" may be used in relation to the feature quantities, they may have substantially the same meaning with respect to the point of being an aggregate of the feature quantities (for example, aggregation result or classification result). For example, if the "cluster" is, in the broad sense of the term, an aggregate of the feature quantities rather than a cluster, in the narrow sense of the term, as a result of the clustering pursuant to a specific method, the "group" of the feature quantities may also be referred to as a "cluster" of the feature quantities.

Figure 7:
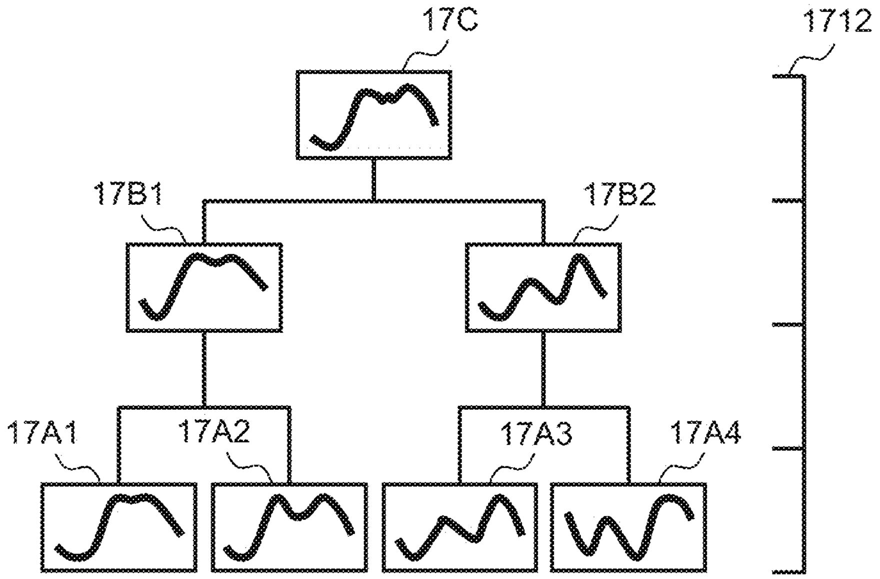
FIG. 7 is a diagram showing an overview of the processing of the first tree structure generation unit.

Ultimately, the first tree structure generation unit 351 outputs the first tree structure illustrated in FIG. 7 (for example, information related to each node (for example, observational data set of each node or its feature quantity), information representing a relation of the node connections, and information representing an aggregation relation of each cluster).

Note that, in FIG. 6 and FIG. 7, the feature quantities 14A1 to 14A4 respectively correspond to the power demand data sets 17A1 to 17A4, the feature quantities 14B1 and 14B2 respectively correspond to the power demand data sets 17B1 and 17B2, and the feature quantity 14C corresponds to the power demand data set 17C. In the example shown in FIG. 7, the power demand data sets 17A1 to 17A4 respectively correspond to a four-leaf node, the power demand data sets 17B1 and 1782 respectively correspond to the two intermediate nodes, and the power demand data set 17C corresponds to the root node. In the explanation of this embodiment, the definition of the terms is, for example, as follows.

- "Root node" means the vertex node.
- "Leaf node" means the terminal node.
- "Intermediate node" means the node between the root node and the leaf node. There may be a tree structure without an intermediate node.
- "Upper" means the side of the root node.
- "Lower" means the side of the leaf node.
- When focusing on a certain node, an "upper node" is a node that is coupled to a certain node via one or more edges and is upper than a certain node (positioned higher than a certain node), and a "parent node" is a node (connected via one edge) that is proximate to a certain node among the upper nodes. Each node other than a leaf node could be a parent node.
- When focusing on a certain node, a "lower node" is a node that is coupled to a certain node via one or more edges and is lower than a certain node (positioned lower than a certain node), and a "child node" is a node (connected via one edge) that is proximate to a certain node among the lower nodes. For example, the power demand data set 17 corresponding to the parent node may be a data set based on two or more power demand data sets 17 respectively corresponding to two or more child nodes belonging to the relevant parent node. Each node other than a root node could be a child node.

(1-4-2) Goodness-of-Fit Data Generation Unit

The goodness-of-fit data generation unit 352, with the first tree structure output from the first tree structure generation unit 351 and the attribute data 721 as the inputs, calculates the goodness-of-fit of each attribute item regarding each branch portion of the first tree structure.

Figure 8:
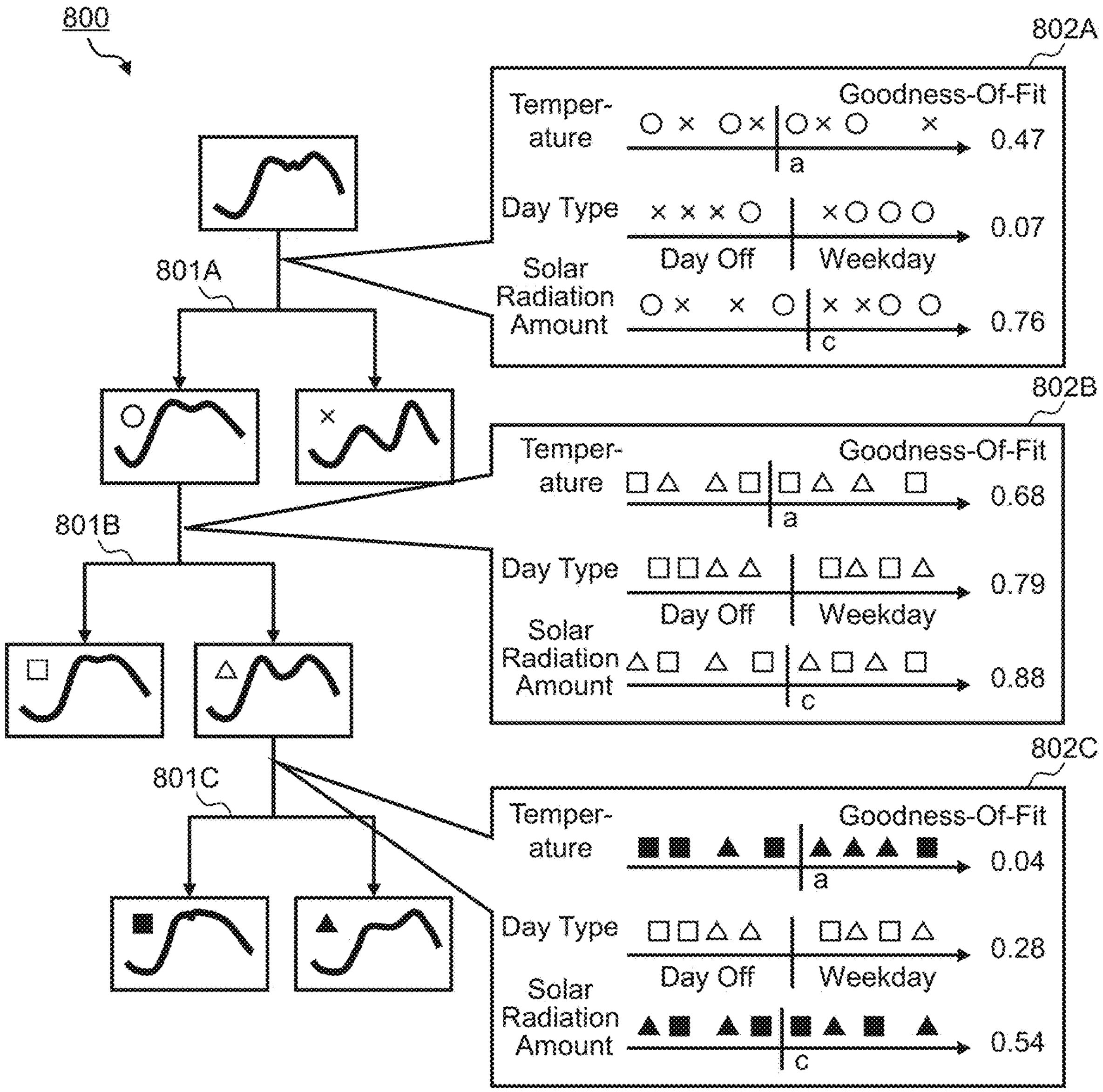
FIG. 8 is a diagram showing an overview of the processing of the goodness-of-fit data generation unit.

The processing contents of the goodness-of-fit data generation unit 352 are now explained more specifically with reference to FIG. 8. In the example of FIG. 8, an observational data set is a power demand data set representing the transition of the power demand. As attribute data sets of each attribute item, there are a temperature data set representing the transition of the temperature, a day type data set representing the daily day type (whether it is a weekday or day off (including a national holiday)), and a solar radiation amount data set representing the transition of the solar radiation amount. In other words, as the attribute items, there are temperature, day type and solar radiation amount. Note that, for the sake of convenience in providing the explanation, in the example of FIG. 8, while a first tree structure that is different from the first tree structure shown in FIG. 7, in the actual processing to be performed by the goodness-of-fit data generation unit 352, the first tree structure generated by the first tree structure generation unit 351 is used.

Foremost, the goodness-of-fit data generation unit 352 receives an input of the first tree structure 800 from the first tree structure generation unit 351. The first tree structure 800 has branch portions 801A to 801C.

Next, the goodness-of-fit data generation unit 352 calculates a threshold for each of the branch portions 801A to 801C so that the entropy regarding the respective attribute items of temperature, day type and solar radiation amount will become minimum. Otherwise, in order to simplify the processing, for example, fundamental statistics such as the average value or median value may be calculated as the threshold for an attribute item that takes on an attribute value as a continuous value.

Here, the branch portion 801A is taken as an example. Two branch destinations (two observational data sets respectively corresponding to the two child nodes) belong to the branch portion 801A. For the sake of convenience in providing the explanation, a marker of "○" or "x" is assigned to each observational data set as an identifier for identifying the branch destination. Here, each distribution of temperature, day type and solar radiation amount related to each observational data set, and the classification of with which observational data set of either group of ○ or x each attribute data set is linked will be as the list shown with a symbol 802A. The goodness-of-fit data generation unit 352 calculates a threshold for each of temperature, day type and solar radiation amount so that the entropy of the observational data set becomes minimum. Consequently, the threshold a or c is calculated regarding an attribute item that takes on a continuous value such as temperature or solar radiation amount as an attribute value, and the threshold (classification) of weekday or day off is identified regarding the attribute item that takes on a discrete value such as day type. The goodness-of-fit data generation unit 352 uses, as the goodness-of-fit, the entropy value according to the threshold obtained for each attribute item regarding each attribute item.

The goodness-of-fit data generation unit 352 calculates the goodness-of-fit for each attribute item also for each of the remaining branch portions 801B and 801C in the same manner as the branch portion 801A. A list of the goodness-of-fit (goodness-of-fit set) calculated for each attribute item regarding the branch portions 801A to 801C is as shown in symbols 802A to 802C. Note that the order of the branch portions 801 for deciding the goodness-of-fit set (and the branch condition described later) may be arbitrarily. In other words, the order may be from highest to lowest that is the opposite from the decided order of the nodes in the generation of the first tree structure 800 (that is, order from lowest to highest), the order may be from lowest to highest in the same manner as the decided order of the nodes, or the order may be random.

Contents of the goodness-of-fit data are now explained with reference to FIG. 9.

The goodness-of-fit data 900 is data representing the goodness-of-fit calculated regarding each attribute item for each branch portion. According to the example of FIG. 9, the goodness-of-fit of temperature, day type and solar radiation amount regarding the branch portion 1 are 0.47, 0.07, and 0.76, respectively. In the example of FIG. 9, the goodness-of-fit means that the degree of fit is higher as the numerical value is smaller. Accordingly, the day time indicated as 0.07 is the most optimal attribute item regarding the branch condition 1.

(1-4-3) Second Tree Structure Generation Unit

The second tree structure generation unit 353 uses, as the inputs, the first tree structure output from the first tree structure generation unit 351 and the goodness-of-fit data output from the goodness-of-fit data generation unit 352. The second tree structure generation unit 353 generates a second tree structure by assigning a branch condition, which was decided based on the goodness-of-fit of each attribute item, to the branch portions of the first tree structure, and outputs the generated second tree structure.

Figure 10:
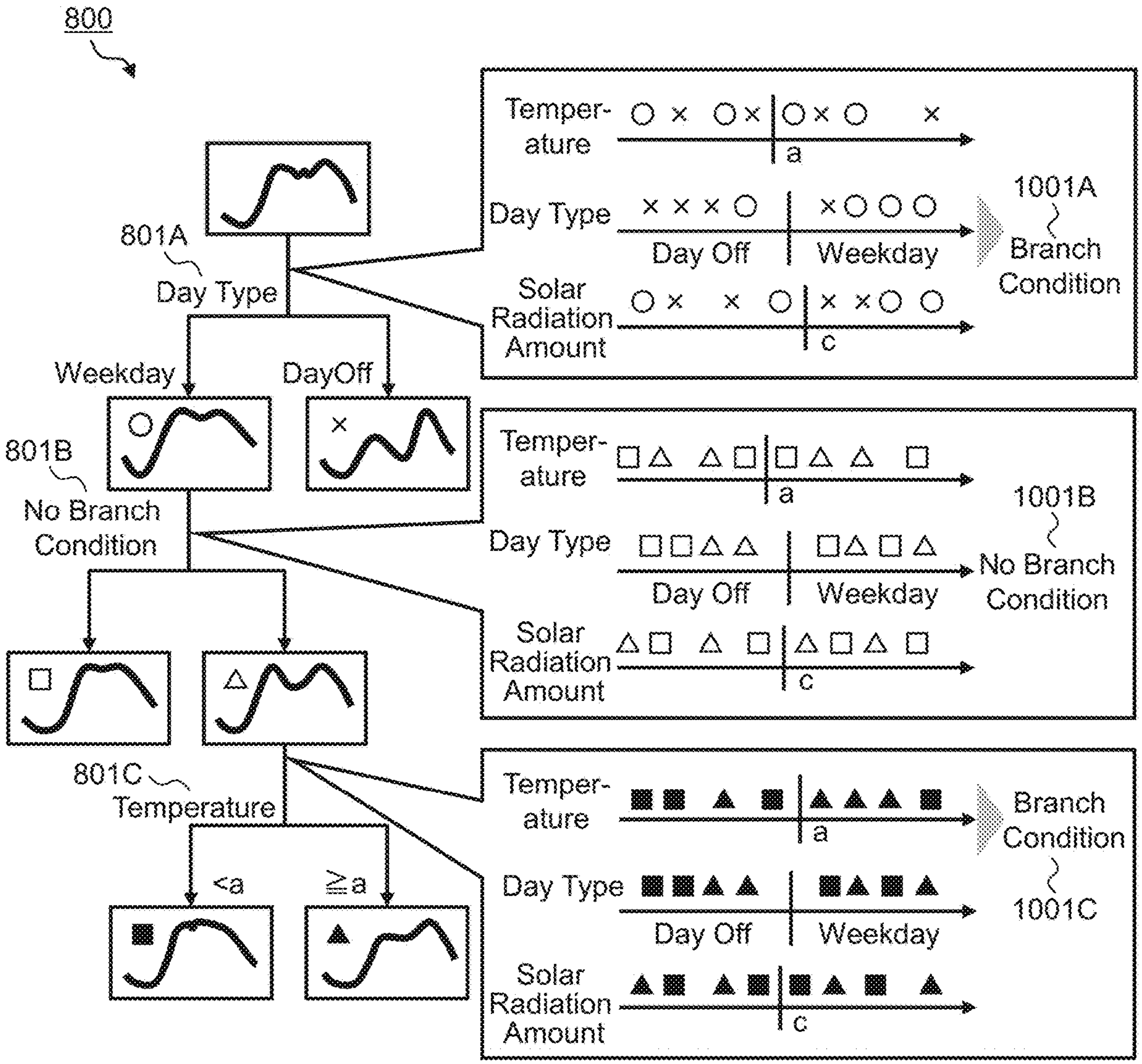
FIG. 10 is a diagram showing an overview of the processing of the second tree structure generation unit.

The processing contents of the second tree structure generation unit 353 are now specifically explained with reference to FIG. 10. In this example, a second tree structure is generated based on the first tree structure shown in FIG. 8 and the goodness-of-fit data shown in FIG. 9.

Foremost, the second tree structure generation unit 353 decides a branch condition regarding the branch portion 801A based on the goodness-of-fit for each attribute item of the relevant branch portion.

For example, with regard to the branch portion 801A, the attribute item in which the entropy of the observational data set before and after branching becomes minimum is the day type. Accordingly, the day type is selected as the attribute item for the branch portion 801A, and the branch condition 1001A of "branch to a group of the observational data set to which the marker of ○ was assigned when the day type is weekday, and to a group of the observational data set to which the marker of x was assigned when the day type is day off" is decided based on the threshold (classification) decided regarding the day type. With regard to the branch portion 801C, the attribute item in which the entropy of the observational data set before and after branching becomes minimum is the temperature. Accordingly, the temperature is selected as the attribute item for the branch portion 801C, and the branch condition 1001C of "branch to a group of the observational data set to which the marker of ■ was assigned when the temperature is less than the threshold a, and to a group of the observational data set to which the marker of ▲ was assigned when the temperature is equal to or greater than the threshold a" is decided based on the threshold a decided regarding the temperature.

Note that, in this embodiment, a branch condition is not necessarily decided and assigned to all branch portions. If there is a branch portion in which the goodness-of-fit of each attribute item is less than a predetermined fit condition, since it is difficult to decide the appropriate branch condition for the relevant branch portion, no branch condition is assigned. Specifically, for example, with regard to the branch portion 801B, the goodness-of-fit of none of the attribute items satisfies a predetermined goodness-of-fit threshold. Here, with regard to the branch portion 801B, "no branch condition" 1001B is assigned. Note that "no branch condition" may also be referred to as an exceptional branch condition. Accordingly, if the impurity (example of goodness-of-fit) after branching of none of the attribute items exceeds a predetermined threshold, "no branch condition" may be assigned to the branch portion. The goodness-of-fit threshold may be common for all attribute items, or may be prepared for each attribute item. Note that the goodness-of-fit threshold may be a value that is arbitrarily set by the user. For example, the range of 2σ or 3σ may be calculated from the values of all goodness-of-fit calculated for all branch portions, and used as the goodness-of-fit threshold. Otherwise, the worst value of the values of the goodness-of-fit may be calculated, and the value obtained by multiplying the worst value by the rate set by the user may also be used as the goodness-of-fit threshold. Moreover, when evaluating the goodness-of-fit for each attribute item, for example, a generally used chi-square test may be used. Specifically, how many observational data was branched to which group is measured based on the threshold of the branching of the relevant attribute item, and the chi-square value is thereby calculated. In this embodiment, the chi-square value represents the level that the observational data set will branch from the parent node to the child node at what level of purity based on the relevant attribute item; that is, represents the degree of fit as the branch condition of the relevant attribute item. This chi-square value is converted into a p value based on a generally used chi-square distribution table and, if the p value falls below the significance level, it is determined that the relevant attribute item is fit as the branch condition. Note that, as the value of the significance level, a generally used value of 0.01 or 0.05 may be used.

Information representing the second tree structure generated as described above is output, and included in the observational data profiling information 21.

(1-4-4) Estimation Unit

The estimation unit 354 calculates, with the observational data profiling information 21 as the input, the expected value or the deviation range of the estimation of values of observational data sets in the future or present or past.

Specifically, for example, the estimation unit 354, with the attribute data incidental to the target of estimation as the input, estimates to which group the target of estimation belongs based on information (information representing the second tree structure) included in the observational data profiling information 21. The estimation unit 354 calculates the representative transition from the likes of the average value of the observational data set belonging to the group of the estimation result, and uses the calculation result as the estimated value of the target of estimation. In addition, the estimation unit 354 may separately calculate the maximum value or the minimum value of the value to be taken by the target of estimation, and correct the estimated value. When the second tree structure has a branch portion associated with "no branch condition", an estimation result of a plurality of affiliated groups is obtained. When there is a plurality of estimation results of the affiliated groups, the estimation unit 354 may calculate the estimated value by using all observational data belonging to each group. Moreover, the estimation unit 354 can calculate the deviation range of the estimated value from the distribution of the values of the observational data set belonging to the group of the estimation result.

The processing of the observational data analysis system 3 according to this embodiment is ended as of the foregoing processing.

(1-5) Effect of this Embodiment

The effect of the observational data analysis system 3 according to this embodiment is now explained with reference to FIG. 11.

Figure 11:
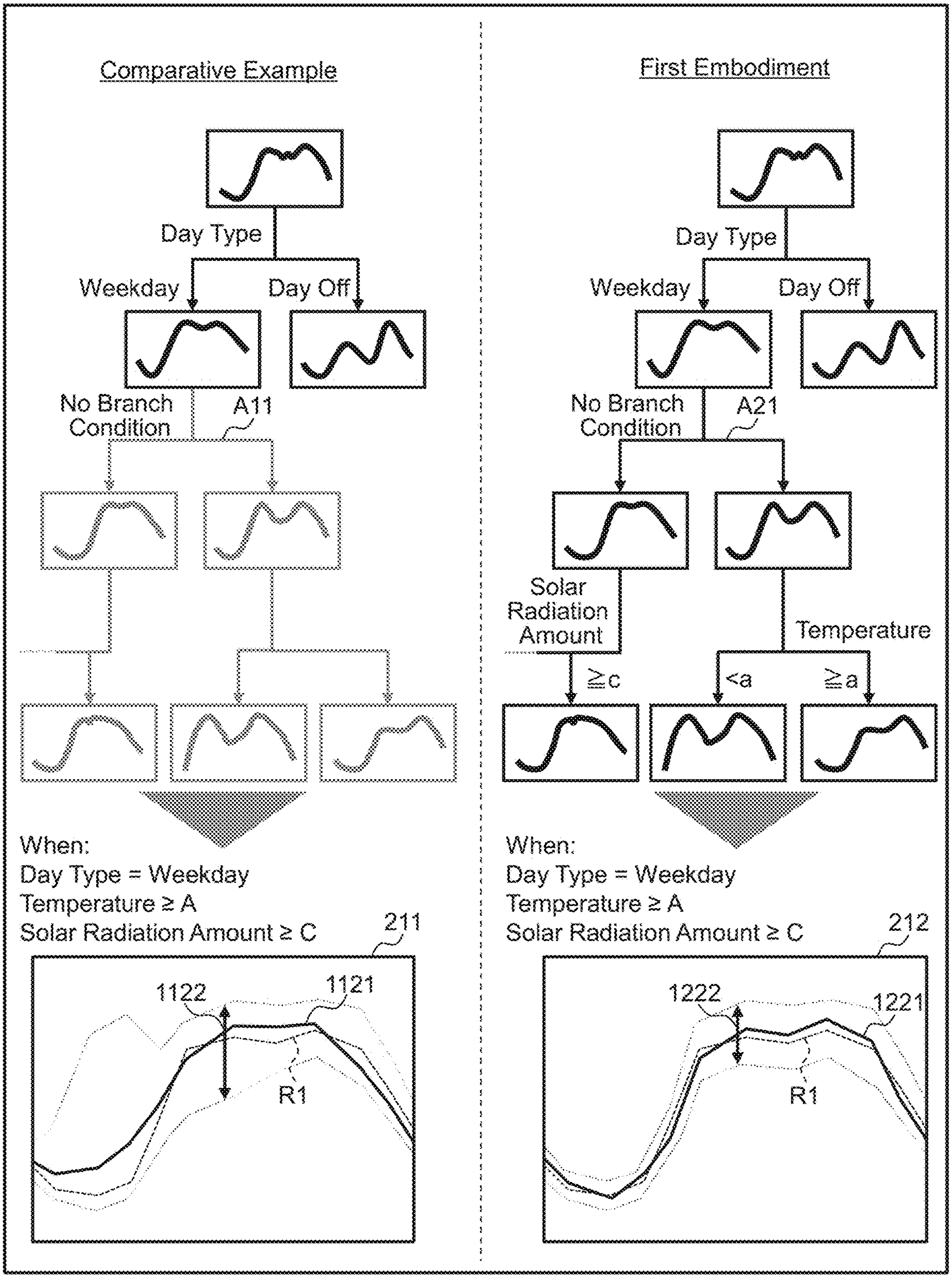
FIG. 11 is a diagram schematically showing the effect yielded by the first embodiment.

FIG. 11 is a conceptual diagram showing the estimation result using the tree structure generated based on the tree structure generation method according to the comparative example, and the estimation result using the tree structure generated based on the tree structure generation method according to this embodiment. Note that the value to be estimated is not limited to a future value, and may also be a current or past value. Moreover, for the sake of explanation, while the tree structures are different in FIG. 7, FIG. 8 and FIG. 10, in the actual processing, the generated tree structure is used.

Foremost explained is an estimation result 211 using the tree structure generated based on the tree structure generation method according to the comparative example which generates the tree structure and the branch condition in parallel. The tree structure generation method according to the comparative example corresponds, for example, to a generally used tree structure generation method such as CART or CHAID. According to this method, when "no branch condition" is assigned to a certain branch portion A11 (that is, when no appropriate branch condition could be found), the growth of the tree structure is stopped at that point in time. In other words, a branch condition of the overall subtree in which the node before branching is the root node in the branch portion A11 is not assigned. To put it differently, it is not possible to generate a tree structure to which "no branch condition" has been assigned. Accordingly, the group to which the target of estimation belongs cannot be estimated based on a granularity that is finer than the node immediately preceding the branch portion A11. As a result of the granularity of the affiliated group becoming coarse, all leaf nodes of the subtree in which the node before branching is the root node in the branch portion A11 are used in the calculation of the expected value or deviation range of the estimation upon calculating the expected value or deviation range of the estimation.

Next, explained is an estimation result 212 using the second tree structure generated based on the tree structure generation method according to this embodiment which generates a second tree structure by assigning a branch condition after the decision of the first tree structure. According to this method, since a branch condition is assigned after generating all branch portions in advance, even when "no branch condition" is assigned in a certain branch portion A21, a branch condition can be assigned to each branch portion of the subtree in which the node before the branching of the branch portion A21 is the root node. Accordingly, even when estimation is performed using a tree structure having a branch portion to which "no branch condition" has been assigned, it is possible to narrow down the leaf nodes to be referred to according to another branch condition regarding each subtree after branching.

Consequently, as illustrated in FIG. 11, in relation to the actual observational data set (time series of values that were actually observed) R1, it is expected that the error of the observational data set 1221 estimated in this embodiment will be smaller in comparison to the error of the observational data set 1121 estimated in the comparative example. Moreover, it is expected that the deviation range 1222 of the estimated value at each time in this embodiment will be smaller in comparison to the deviation range 1122 of the estimation at each time in the comparative example.

(1-6) Summary of the First Embodiment

This embodiment can be summarized, for example, as follows. Note that the following summary may include a supplementation of the foregoing explanation.

A system comprises a first tree structure generation unit 351 which generates a first tree structure representing a relation of a plurality of observational data sets in observational data 521, a goodness-of-fit data generation unit 352 which generates goodness-of-fit data based on attribute data 721 regarding one or more branch portions included in the first tree structure, and a second tree structure generation unit 353 which generates a second tree structure as a tree structure in which a branch condition decided based on the goodness-of-fit data is associated with a branch portion included in the first tree structure. The system may be, for example, a tree structure generation system in which an estimation unit 354 has been excluded from an observational data analysis system 3. Note that each of a plurality of observational data sets may be a data set including values observed at each of one or more points in time (for example, time series data of observation values). With regard to each of a plurality of nodes in the first tree structure, the relevant node may be a node based on one or more observational data sets corresponding to one or more nodes including the relevant node, and the one or more nodes may be the relevant node, or may include the relevant node and a node that is lower than the relevant node (for example, child node). The attribute data 721 may include one or more attribute values at one or more points in time regarding each of one or more attribute items. The goodness-of-fit data may include the goodness-of-fit regarding each of one or more attribute items regarding each of one or more branch portions in the first tree structure. With regard to each of the one or more attribute items for each branch portion, goodness-of-fit is a value calculated based on a parent node and two or more child nodes belonging to the relevant branch portion, and one or more attribute values corresponding to the relevant attribute item, and may be a value which represents a degree that the relevant attribute item will fit as a base of a branch condition. In this embodiment, as the value of the goodness-of-fit is smaller, the degree of fit is higher.

According to this system, the goodness-of-fit of the attribute items regarding each branch portion is calculated after the first tree structure is generated, and the branch condition is associated with the branch portion of the first tree structure based on the calculated goodness-of-fit. The height (depth) of the second tree structure is based on the relation in a plurality of observational data sets as a whole, and in the estimation using this kind of second tree structure, the leaf nodes to be referenced can be narrowed down. In other words, a tree structure that contributes to the accurate estimation of the target of estimation is generated.

The first tree structure generation unit 351 may generate the first tree structure by sequentially generating nodes upward from a leaf node. In the first tree structure, for each parent node, two or more child nodes belonging to the relevant parent node may be two or more nodes corresponding to each of two or more observational data sets in a same similarity range. Specifically, for example, in the first tree structure, the two or more child nodes belonging to the parent node may be two or more nodes corresponding to each of two or more observational data sets in which the feature quantities are in the same similarity range. The "feature quantities" in this case may be the representative feature quantity. In other words, until the cluster that is formed last becomes one, (1) the formation of a cluster for each of the two or more feature quantities in the same similarity range, and (2) the generation of the representative feature quantity based on the relevant cluster for each cluster, may be repeated. Since nodes are formed from lower to higher, it is considered that noise in the observational data set will be less as the nodes are more upper and, therefore, even if a second tree structure is generated based on a plurality of observational data sets in a separate observational data, it is expected that the fluctuation in the attribute items as the base of the branch condition regarding the upper branch portion will be minimal.

The second tree structure generation unit 353 may associate, with a branch portion in which goodness-of-fit of the one or more attribute items satisfies at least one fit condition among one or more fit conditions among branch portions in the second tree structure, a branch condition based on an attribute item corresponding to goodness-of-fit satisfying the at least one fit condition. It is thereby possible to associate an appropriate branch condition with the branch portion. Note that the "fit condition" may be a condition of whether the goodness-of-fit is less than the goodness-of-fit threshold.

When there is a branch portion in which goodness-of-fit of the one or more attribute items does not satisfy any of the one or more compatibility conditions among branch portions in the second tree structure, the second tree structure generation unit 353 may associate no branch condition with the relevant branch portion. Even when no branch condition is associated in the foregoing manner, as described above, reference of the estimation unit 354 may be performed lower than the branch portions with which no branch condition is associated in the estimation.

The system may further comprise an estimation unit 354 which outputs estimation data based on the result of referring to the second tree structure from the root node to the leaf node with the input data including one or more attribute values regarding at least one attribute item as the input. It is thereby possible to perform both generation (this may also be referred to as learning) of the second tree structure based on a plurality of observational data sets, and estimation using the generated second tree structure. Note that the reference of the estimation unit 354 may proceed to each of one or more child nodes among the two or more child nodes belonging to the relevant branch portion upon reaching the branch portion with which no branch condition is associated. It is expected that accurate estimation of the target of estimation can thereby be performed. The branch destination from the branch portion with which no branch condition is associated may be all child nodes, or partial child nodes selected based on a predetermined rule (may include random selections).

(2) Other Embodiments

Other embodiments are now explained. Here, differences in comparison to the first embodiment will be mainly explained, and the explanation of points that are common with the first embodiment will be omitted or simplified.

(2-1) Second Embodiment (Pruning of the Second Tree Structure)

In the second embodiment, the second tree structure generated by the second tree structure generation unit 353 is processed, and the processed second tree structure is included in the observational data profiling information 21.

Figure 12:
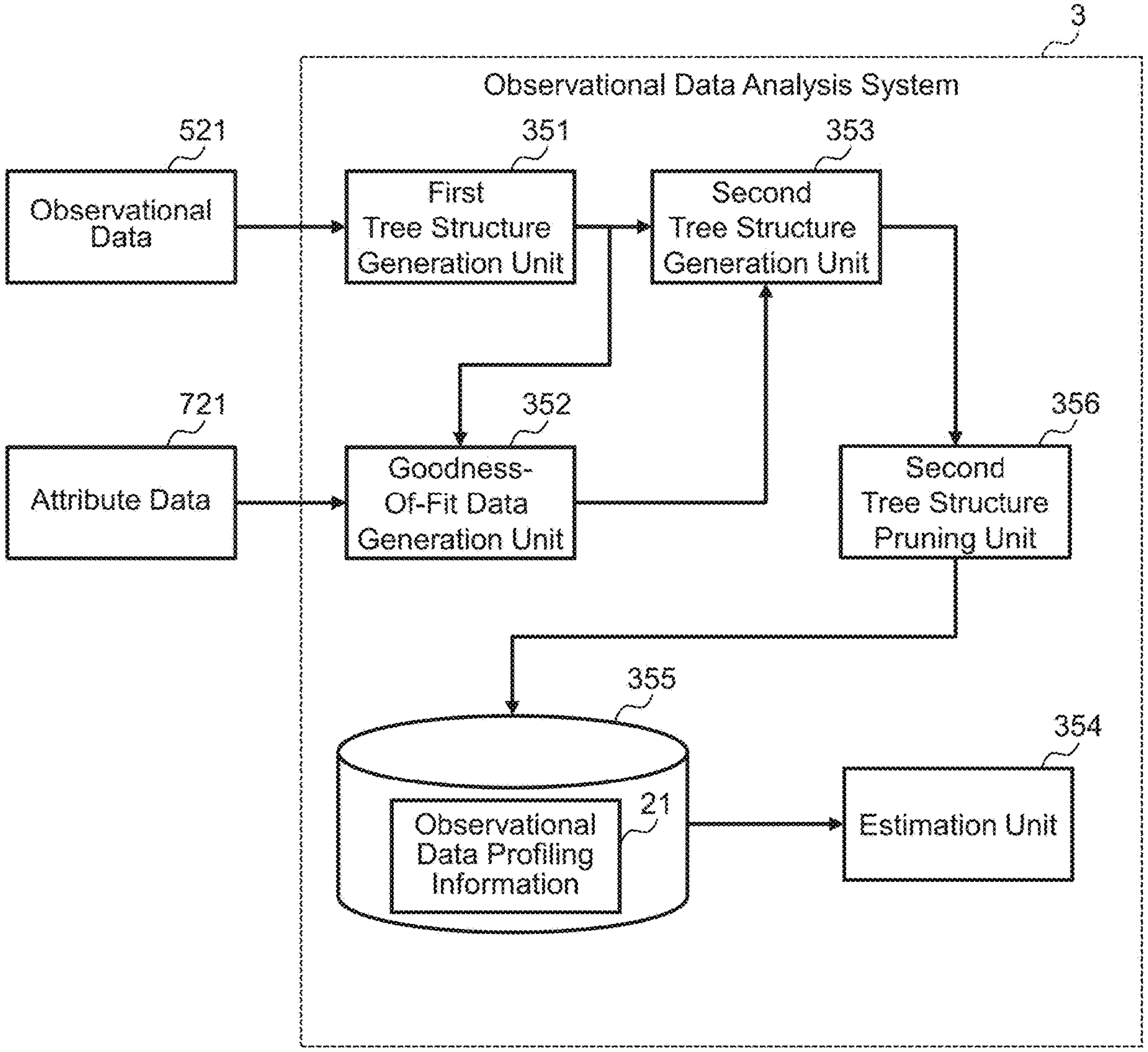
FIG. 12 is a diagram showing the data flow of the observational data analysis system according to the second embodiment.

The second embodiment is now specifically explained with reference to FIG. 12. The observational data analysis system 3 additionally comprises a second tree structure pruning unit 356. The second tree structure as the output of the second tree structure generation unit 353 is processed with the second tree structure pruning unit 356, and the processed second tree structure is stored in the storage area 355.

The second tree structure pruning unit 356 performs pruning of the second tree structure with the second tree structure output from the second tree structure generation unit 353 as the input. "Pruning" is to delete information of all branch portions or branch conditions of the subtree included in the second tree structure; that is, information of the process of the group of the observational data sets being branched.

The subtree to be subject to pruning may be a subtree corresponding to a predetermined condition. The subtree corresponding to a predetermined condition may be, for example, at least one among the following.

- Subtree in which each child node belonging to the highest branch portion among the branch portions to which "no branch condition" has been assigned is the root node.

Subtree in which "no branch condition" has been assigned to all branch portions.

Subtree in which the node based on a cluster having a representative feature quantity at a position where the distance from the representative feature quantity of the cluster corresponding to the root node of the second tree structure exceeds a prescribed threshold is the root node.

Subtree in which each child node of the node selected by the user so that the processed second tree structure becomes the second tree structure, in which the node selected by the user is the leaf node, is the root node.

By performing pruning, the effect of preventing the excessive learning of the second tree structure and reducing the subsequent processing load by deleting information not required for analysis can be expected.

(2-2) Third Embodiment (Correction of Influence that the Attribute Data has on the Observational Data)

In the third embodiment, the processed observational data of the observational data 521 may be input to the first tree structure generation unit 351.

Figure 13:
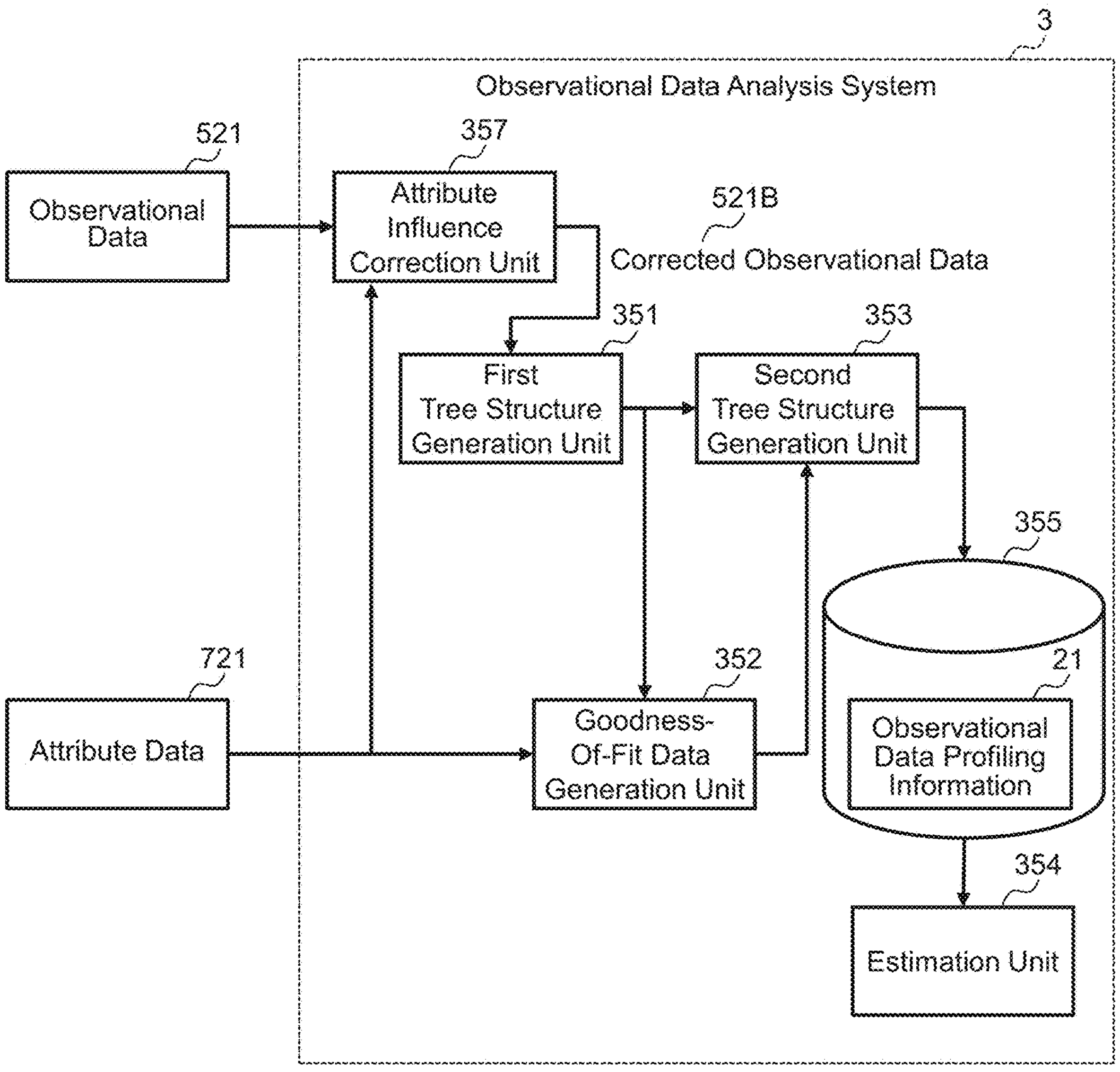
FIG. 13 is a diagram showing the data flow of the observational data analysis system according to the third embodiment.

The third embodiment is now specifically explained with reference to FIG. 13. The observational data analysis system 3 further comprises an attribute influence correction unit 357. The observational data 521 is processed by the attribute influence correction unit 357, and the processed observational data is output as the corrected observational data 521B and input to the first tree structure generation unit 351.

The attribute influence correction unit 357 performs processing of selecting one or more arbitrary attribute values, and excluding an influence component of the relevant attribute value from the time course representing the observational data set in the observational data 521. Specifically, for example, the attribute influence correction unit 357 creates a model which explains the fluctuation in the observation values in the observational data set based on one or more attribute values, and subtracts, from the observational data set, the value output from the model as the influence component of the attribute value. As a model for calculating the influence component of the attribute value, a publicly known model (for example, regression model (for example, simple regression model, multiple regression model, Gaussian process regression model or the like), neural network model, model using a tree structure) may be adopted.

As a result of excluding in advance, from the observational data set, the influence component of the attribute values having a strong correlation with the observational data set, the difference caused by the difference in the attribute values among the respective observational data sets can be cancelled out, and it is expected that the modes of the time source of the observational data set can be arranged to a certain extent. Accordingly, observational data can be compiled in fewer number of aggregation units in the feature quantity aggregation unit 3512 as the internal processing of the first tree structure generation unit 351, and it is expected that the subsequent processing load can be reduced.

(2-3) Fourth Embodiment (Extraction of a Partial Sample from the Observational Data)

In the fourth embodiment, the extracted observational data 521C as the partial observational data that was partially extracted from the observational data 521 may be input to the first tree structure generation unit 351.

Figure 14:
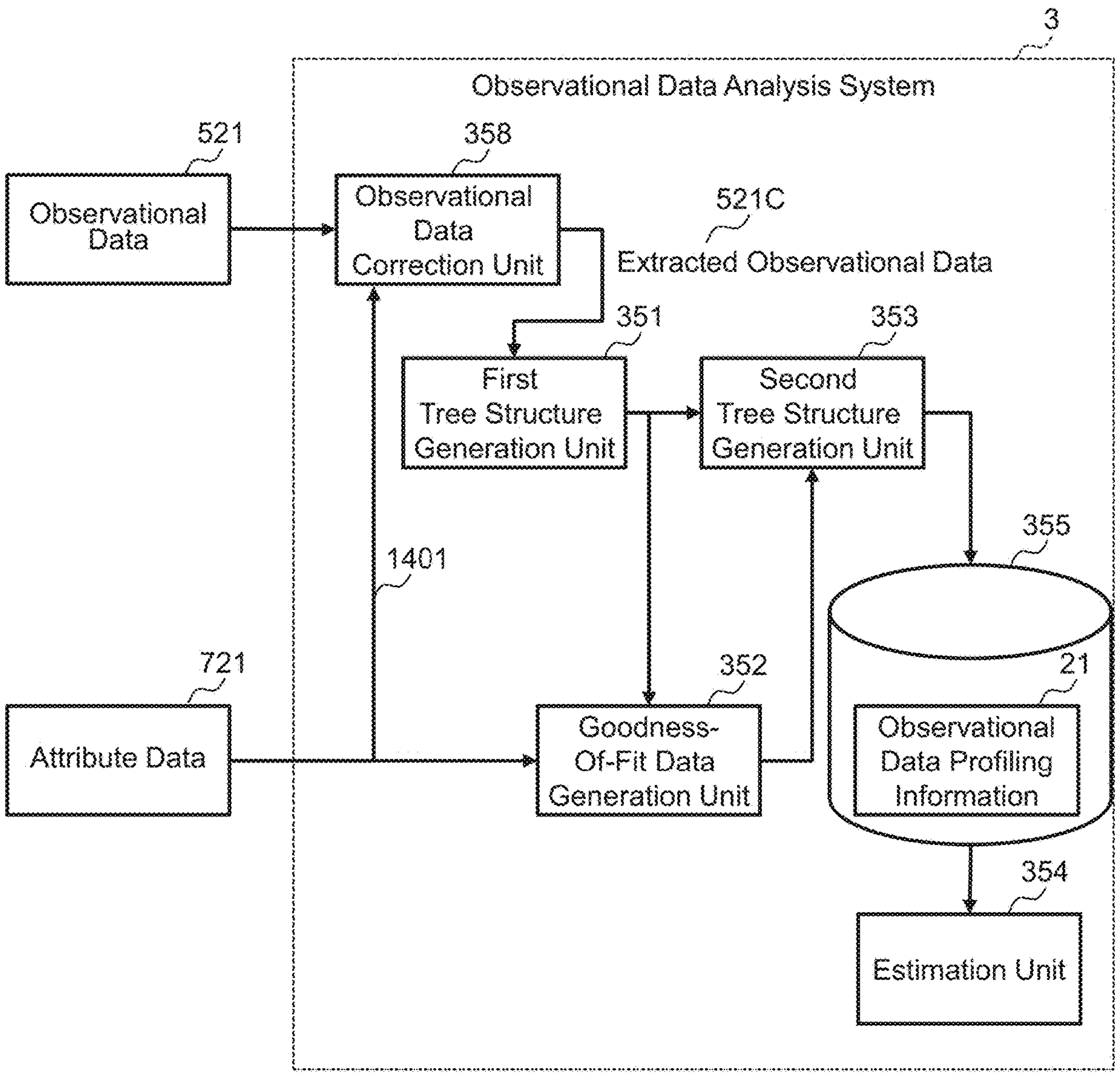
FIG. 14 is a diagram showing the data flow of the observational data analysis system according to the fourth embodiment.

The fourth embodiment is now specifically explained with reference to FIG. 14. The observational data analysis system 3 additionally comprises an observational data extraction unit 358. The observational data 521 is processed by the observational data extraction unit 358, and the processed observational data is output as the extracted observational data 521C and input to the first tree structure generation unit 351.

The observational data extraction unit 358 extracts the partial observational data from the input observational data 521 as a partial sample. Extraction of the partial observational data may be an extraction in which one or more of the following are adopted.

Sample size of the extracted partial sample may be, for example, a value set by the user.

The observational data extraction unit 358 may extract partial observational data from the observational data 521 based on the attribute value linked to each observational data set. Here, for example, the attribute data 721 is also assigned as the input data 1401 of the observational data extraction unit 358.

The observational data extraction unit 358 may repeatedly perform extraction with one or more arbitrary samples as the minimum unit, and continue to perform extraction until one or more of fundamental statistics such as the average value, median value, or variance of observational data included in the partial sample and barycentric coordinates of the feature quantity to be used in the generation of the first tree structure converge to a certain value.

The observational data extraction unit 358 may repeat extraction in each of the minimum units until the deviation of the total value of the observational data sets and the predetermined target value becomes minimum.

The observational data extraction unit 358 may delete a part of the extracted observational data.

By compressing the size of the observational data based on the foregoing processing, it is expected that the subsequent processing load can be reduced. If the input observational data 521 underwent colored sampling from a population, it may be shaped into a partial sample of white sampling. Conversely, a partial sample based on colored sampling may be extracted from the input observational data 521.

(2-4) Fifth Embodiment (Selection of Attribute Data)

In the fifth embodiment, partial attribute data may be extracted from the attribute data 721 and input to the goodness-of-fit data generation unit 352.

Figure 15:
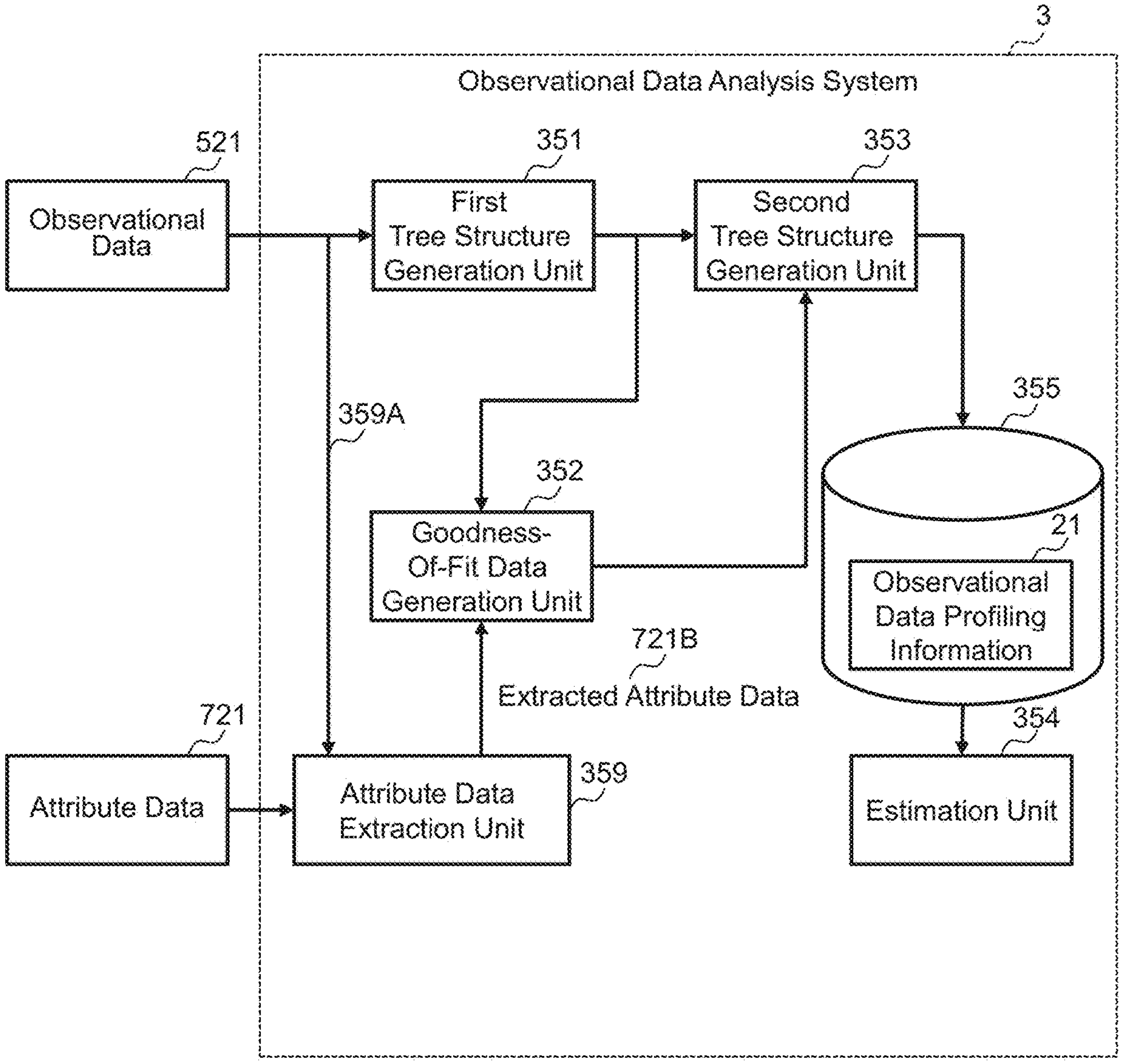
FIG. 15 is a diagram showing the data flow of the observational data analysis system according to the fifth embodiment.

The fifth embodiment is now explained with reference to FIG. 15. The observational data analysis system 3 further comprises an attribute data extraction unit 359. After the attribute data 721 is processed by the attribute data extraction unit 359, the processed attribute data is output as the extracted attribute data 721B and input to the goodness-of-fit data generation unit 352.

The attribute data extraction unit 359 extracts partial attribute data from the input attribute data 721. The attribute data to be extracted may be, for example, an attribute data set of partial attribute items among a plurality of attribute items. Extraction of the partial attribute data may be an extraction in which one or more of the following are adopted.

Extraction of the attribute data may be performed, for example, based on an attribute item selected manually by the user.

The attribute data extraction unit 359 may evaluate the correlation of each attribute data set and the observational data set, and extract an attribute data set having a correlation coefficient of a certain level or higher, or a combination of attribute data sets in which correlation with the observational data set of a certain level or higher can be obtained based on such combination.

By narrowing down the attribute data based on the foregoing processing (for example, narrowing down a plurality of attribute items into partial attribute items), it is expected that the subsequent processing load can be reduced.

(2-5) Sixth Embodiment (Omission of Feature Quantity Aggregation Unit)

In the sixth embodiment, the first tree structure generation unit 351 does not need to comprise the feature quantity aggregation unit 3512. Thus, the output of the feature quantity calculation unit 3511 may be directly input to the feature quantity classification unit 3513.

By adopting a configuration of inputting the output of the feature quantity calculation unit 3511 directly to the feature quantity classification unit 3513, in return for the subsequent processing load increasing as a result of not aggregating the feature quantities, accurate analysis is enabled in comparison to the case of using a representative feature quantity.

(2-6) Seventh Embodiment (Assignment of Attribute Data to all Branch Portions)

In the seventh embodiment, even with a branch portion in which the goodness-of-fit of none of the attribute items satisfies the fit condition, some kind of branch condition may invariably be assigned. For example, when there is a branch portion among the branch portions in the second tree structure in which the goodness-of-fit of one or more attribute items does not satisfy any of the one or more fit conditions, the second tree structure generation unit 353 may associate, with that branch portion, a branch condition based on an attribute item corresponding to the goodness-of-fit in which the deviation with the fit condition (for example, goodness-of-fit threshold) is the smallest.

By some kind of branch condition being invariably assigned to all branch portions based on the attribute data 721, it is expected that the affiliated group and the estimated value of the target of estimation can be uniquely prescribed.

(2-7) Eighth Embodiment (Change of Calculation Method of the Representative Feature Quantity Upon Generating the First Tree Structure)

In the eighth embodiment, in substitute for calculating new cluster barycentric coordinates from two cluster barycenter coordinates and using such coordinates as the new representative feature quantity, the feature quantity classification unit 3513 may calculates new cluster barycentric coordinates from all observational data sets belonging to each of the two clusters, and use such coordinates as the new representative feature quantity.

By generating the first tree structure while calculating new cluster barycentric coordinates from all observational data sets belonging to each of the two clusters, it becomes possible to generate the first tree structure so that the representative feature quantity of the cluster corresponding to the root node coincides with the representative feature quantity calculated from all observational data.

(2-8) Ninth Embodiment (Change of Number of the Attribute Data to be Assigned as a Branch Condition)

In the ninth embodiment, the second tree structure generation unit 353 may use the attribute condition to be assigned to the branch portion as the condition based on a plurality of attribute items. For example, when selecting a plurality of attribute items, the second tree structure generation unit 353 may select an arbitrary number of attribute items in order so that the goodness-of-fit as the branch condition will be upper, or select all attribute items so that the goodness-of-fit satisfies the threshold, or specific attribute items among a plurality of attribute items selected in the manner described above may be deleted manually by the user, and the attribute items that were not selected may be selected manually by the user.

By selecting a plurality of attribute items relative to one branch portion as the base of the branch condition, it is expected that the group of observational data sets to which the target of estimation belongs can be estimated with higher accuracy. Moreover, by adopting a configuration where specific attribute items can be manually deleted among a plurality of attribute items selected as the branch condition and non-selected attribute items can be manually selected, for example, it is possible to support the association of proper branch conditions even when the goodness-of-fit is not properly evaluated due to lack of data or other reasons.

While several embodiments were explained above, these are exemplifications for explaining the present invention, and are not intended to limit the scope of the present invention only to these embodiments. The present invention may also be worked in various other modes. For example, two or more of the first embodiment to the ninth embodiment explained above may be combined. For example, two or more of the second tree structure pruning unit 356, the attribute influence correction unit 357, the observational data extraction unit 358, and the attribute data extraction unit 359 listed in the foregoing embodiments may be concurrently used.

REFERENCE SIGNS LIST

1 . . . data processing system, 3 . . . observational data analysis system, 5 . . . observational data storage system, 7 . . . attribute data storage system, 8 . . . communication path, 9 . . . operation device, 10 . . . supply and demand management equipment, 11 . . . control device.

The invention claimed is:

1. A data analysis system, comprising:

an interface apparatus which accepts inputs of measurement data and attribute data;

a storage apparatus which stores the measurement data and the attribute data input via the interface apparatus; and a processor which is coupled to the interface apparatus and the storage apparatus, wherein:

the attribute data includes one or more attribute values at one or more points in time regarding each of one or more attribute items;

the processor generates a first tree structure which represents a relation of a plurality of measurement data sets according to at least a part of the measurement data stored in the storage apparatus;

each of the plurality of measurement data sets is a data set including values measured at each of one or more points in time;

with regard to each of a plurality of nodes in the first tree structure, a relevant node is a node based on one or more measurement data sets corresponding to one or more nodes including the relevant node; and the one or more nodes include the relevant node and, if there are nodes that are lower than the relevant node, include those lower nodes;

the processor generates goodness-of-fit data based on at least a part of the attribute data stored in the storage apparatus regarding one or more branch portions included in the first tree structure;

the goodness-of-fit data includes goodness-of-fit regarding each of one or more attribute items regarding each of the one or more branch portions;

with regard to each of the one or more attribute items for each branch portion, goodness-of-fit is a value calculated based on a parent node and two or more child nodes belonging to a relevant branch portion, and one or more attribute values corresponding to a relevant attribute item, and represents a degree that the relevant attribute item will fit as a base of a branch condition;

the processor generates a second tree structure as a tree structure in which a branch condition decided based on the goodness-of-fit data is associated with a branch portion included in the first tree structure; and the processor outputs estimation data based on a result of referring to the second tree structure from a root node to a leaf node with input data including one or more attribute values regarding at least one attribute item as an input.

2. The data analysis system according to claim 1, wherein:

the processor generates the first tree structure by sequentially generating nodes upward from a leaf node; and in the first tree structure, for each parent node, two or more child nodes belonging to the relevant parent node are two or more nodes corresponding to each of two or more measurement data sets in a same range.

3. The data analysis system according to claim 2, wherein:

in the first tree structure, two or more child nodes belonging to a parent node are two or more nodes corresponding to each of two or more measurement data sets in which a feature quantity is in a same range.

4. The data analysis system according to claim 1, wherein:

the processor associates, with a branch portion in which goodness-of-fit of the one or more attribute items satisfies at least one fit condition among one or more fit conditions among branch portions in the second tree structure, a branch condition based on an attribute item corresponding to goodness-of-fit satisfying the at least one fit condition.

5. The data analysis system according to claim 4, wherein:

when there is a branch portion in which goodness-of-fit of the one or more attribute items does not satisfy any of the one or more fit conditions among branch portions in the second tree structure, the processor associates no branch condition with the relevant branch portion.

6. The data analysis system according to claim 4, wherein:

when there is a branch portion in which goodness-of-fit of the one or more attribute items does not satisfy any of the one or more fit conditions among branch portions in the second tree structure, the processor associates a branch condition based on an attribute item corresponding to goodness-of-fit in which deviation from a fit condition is smallest with the relevant branch portion.

7. The data analysis system according to claim 1, wherein:

when there is a branch portion in which goodness-of-fit of the one or more attribute items does not satisfy any of the one or more fit conditions among branch portions in the second tree structure, the processor associates no branch condition with the relevant branch portion; and when referral by the processor reaches a branch portion associated with no branch condition, the processor proceeds to one or more child nodes among two or more child nodes belonging to the relevant branch portion.

8. The data analysis system according to claim 1, wherein:

the processor prunes, from the second tree structure, a subtree corresponding to a predetermined condition.

9. The data analysis system according to claim 7, wherein:

a subtree corresponding to the predetermined condition is at least one among the following:

a subtree in which a child node belonging to a highest branch portion among branch portions associated with no branch condition is used as a root node;

a subtree in which each branch portion has no branch condition;

a subtree in which a node based on a cluster having a representative feature quantity at position where a distance from a representative feature quantity of a cluster corresponding to a root node of a second tree structure exceeds a predetermined threshold is used as a root node; or a subtree in which each child node of a node selected by a user is used as a root node.

10. The data analysis system according to claim 1, wherein:

the processor deletes, from the plurality of measurement data sets, a component identified from a relationship of a variation in a measured value and one or more attribute values regarding at least one attribute item.

11. The data analysis system according to claim 1, wherein:

the processor extracts, with regard to each of a plurality of original measurement data sets including measured values at each of a plurality of points in time, a measured value as a partial sample from the relevant original measurement data set; and each of the plurality of measurement data sets is a measurement data set based on the extracted measured value.

12. The data analysis system according to claim 1, wherein:

the processor extracts attribute values regarding a part of the attribute items from the attribute data; and a part of the attribute data is data including the extracted attribute value.

13. A data analysis method, wherein:

a computer generates a first tree structure which represents a relation of a plurality of measurement data sets according to at least a part of input measurement data;

each of the plurality of measurement data sets is a data set including values measured at each of one or more points in time;

with regard to each of a plurality of nodes in the first tree structure, a relevant node is a node based on one or more measurement data sets corresponding to one or more nodes including the relevant node;

the one or more nodes include the relevant node and, if there are nodes that are lower than the relevant node, include those lower nodes;

the computer generates goodness-of-fit data based on at least a part of input attribute data regarding one or more branch portions included in the first tree structure;

the attribute data includes one or more attribute values at one or more points in time regarding each of one or more attribute items;

the goodness-of-fit data includes goodness-of-fit regarding each of one or more attribute items regarding each of the one or more branch portions;

with regard to each of the one or more attribute items for each branch portion, goodness-of-fit is a value calculated based on a parent node and two or more child nodes belonging to a relevant branch portion, and one or more attribute values corresponding to a relevant attribute item, and represents a degree that the relevant attribute item will fit as a base of a branch condition;

the computer generates a second tree structure as a tree structure in which a branch condition decided based on the goodness-of-fit data is associated with a branch portion included in the first tree structure; and the computer outputs estimation data based on a result of referring to the second tree structure from a root node to a leaf node with input data including one or more attribute values regarding at least one attribute item as an input.

14. A tree structure generation method, wherein:

a computer generates a first tree structure which represents a relation of a plurality of measurement data sets according to at least a part of measurement data;

each of the plurality of measurement data sets is a data set including values measured at each of one or more points in time;

with regard to each of a plurality of nodes in the first tree structure, a relevant node is a node based on one or more measurement data sets corresponding to one or more nodes including the relevant node;

the one or more nodes include the relevant node and, if there are nodes that are lower than the relevant node, include those lower nodes;

the computer generates goodness-of-fit data based on at least a part of attribute data regarding one or more branch portions included in the first tree structure;

the attribute data includes one or more attribute values at one or more points in time regarding each of one or more attribute items;

the goodness-of-fit data includes goodness-of-fit regarding each of one or more attribute items regarding each of the one or more branch portions;

with regard to each of the one or more attribute items for each branch portion, goodness-of-fit is a value calculated based on a parent node and two or more child nodes belonging to a relevant branch portion, and one or more attribute values corresponding to a relevant attribute item, and represents a degree that the relevant attribute item will fit as a base of a branch condition; and the computer generates a second tree structure as a tree structure in which a branch condition decided based on the goodness-of-fit data is associated with a branch portion included in the first tree structure.

* * * * *